United States Patent [19]
Raymond

[11] 3,867,696
[45] Feb. 18, 1975

[54] AN IMPROVED ELECTRICAL CURRENT MEASURING METER HAVING INTEGRAL CALIBRATION AND ZERO ADJUSTMENT MEANS

[76] Inventor: Eugene B. Raymond, 4041 Grove St., Skokie, Ill. 60076

[22] Filed: Jan. 4, 1974

[21] Appl. No.: 430,794

[52] U.S. Cl. .............................................. 324/146
[51] Int. Cl. ........................... G01r 1/04, G01r 5/16
[58] Field of Search .......... 324/146, 151, 152, 154, 324/156

[56] References Cited
UNITED STATES PATENTS

| | | | |
|---|---|---|---|
| 1,709,973 | 4/1929 | Fallon | 324/146 |
| 2,446,431 | 8/1948 | Pfeffer | 324/146 |
| 3,013,210 | 12/1961 | Wargo | 324/146 |
| 3,200,332 | 8/1965 | Pfeffer | 324/146 |
| 3,275,936 | 9/1966 | Huston | 324/146 |
| 3,414,817 | 12/1968 | Blowers | 324/146 |
| 3,510,774 | 5/1970 | Bakke et al. | 324/146 |
| 3,671,861 | 6/1972 | Fleetman et al. | 324/146 |

*Primary Examiner*—Gerard R. Strecker
*Attorney, Agent, or Firm*—Fitch, Even, Tabin & Luedeka

[57] ABSTRACT

An improved electrical current measuring meter is disclosed which has a case with a transparent front face exposing an elongated pointer and a measuring scale, wherein the pointer carries a circular magnet and is rotatable on a shaft that extends forwardly from the inner frame of the case. A thin, horizontal current conducting member is attached to the inner frame and carries the current to be measured, the interaction of the current and the magnet of the pointer producing a torque that rotates the pointer in proportion to the magnitude of the current. The magnetic attraction between the conducting member and the magnet on the pointer keeps the pointer on the shaft. The inner frame of the case has a circular opening in the back that is concentric with the shaft and is adapted to receive a magnet holder containing a second magnet therein which is adjustably and frictionally held due to the resilience of the holder. Thus, the distance of the second magnet from the conducting member and the pointer as well as the angular position may be varied to calibrate the meter as well as provide a zero adjustment of the pointer.

13 Claims, 4 Drawing Figures

PATENTED FEB 18 1975 3,867,696
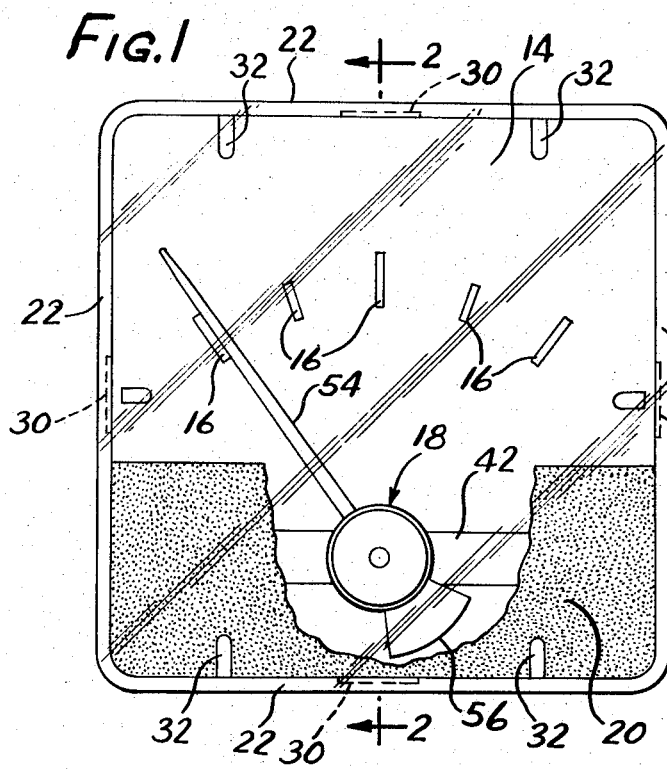
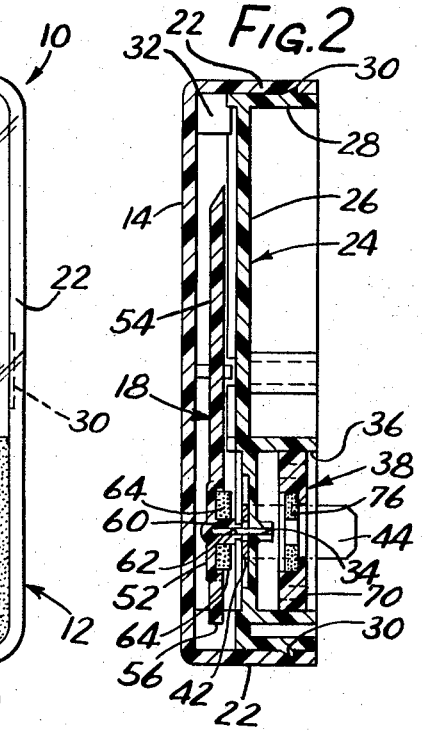
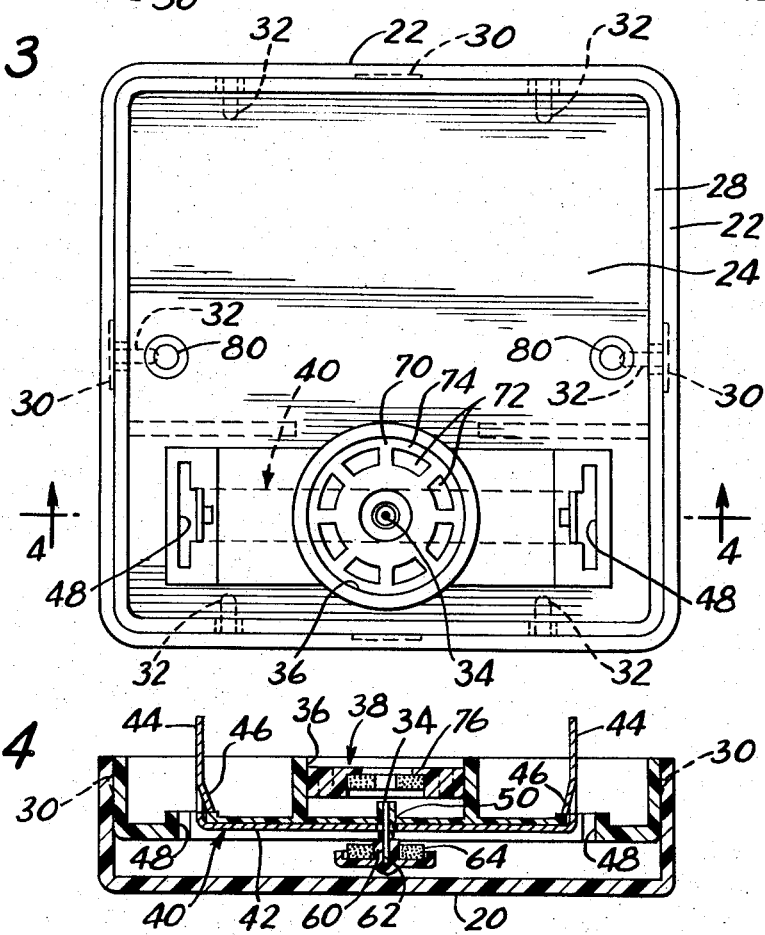
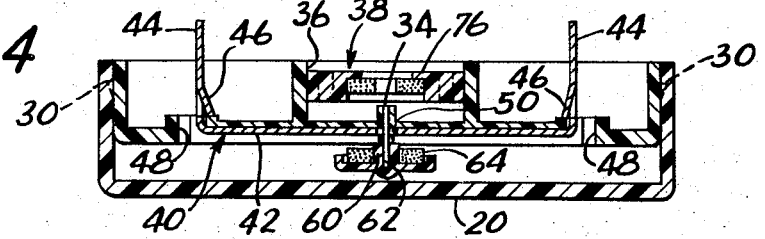

AN IMPROVED ELECTRICAL CURRENT MEASURING METER HAVING INTEGRAL CALIBRATION AND ZERO ADJUSTMENT MEANS

This invention relates generally to electrical measuring instruments and, more specifically, to an electrical current measuring meter.

While electrical current measuring meters or ammeters have been manufactured for decades and embody a multitude of designs which function exceedingly well, many ammeters are quite complex and this complexity necessarily results in increased costs of manufacture. Many of the complex mechanisms that have been incorporated into such ammeters have been designed for the purpose of increasing accuracy of the measurement. There is little doubt that many applications require extreme accuracy and will justify the increased cost that usually accompanies such a complex instrument.

There is a need for inexpensive ammeters for use in those applications where extreme accuracy is not required, and although inexpensive instruments are supposedly being made for this market, many of these designs are quite intricate and require a large number of components which contribute to increased production cost and assembly difficulties.

Accordingly, it is an object of the present invention to provide an improved ammeter of simple design, using a minumum of parts, which can be easily calibrated and adjusted.

Another object of the present invention is to provide such an improved ammeter having a measuring range that can be easily adjusted and calibrated without requiring structural modification of the ammeter.

Other objects and advantages will become apparent upon reading the following detailed description in conjunction with the attached drawings in which:

FIG. 1 is a plan view of an ammeter embodying the present invention;

FIG. 2 is a cross section of the ammeter embodying the present invention and is taken along the line 2—2 of FIG. 1;

FIG. 3 is a rear plan view of the ammeter shown in FIG. 1; and,

FIG. 4 is a cross section taken along the line 4—4 in FIG. 3.

Turning now to the drawings, and particularly FIG. 1, an ammeter, indicated generally at 10, includes an outer cover 12 having a transparent front face portion 14 through which indicia such as the indicator marks 16 and a pointer 18 are visible. The lower portion 20 of the front face is preferably painted or frosted on the inside surface to present a more attractive overall appearance by covering the mechanical elements of the meter. The cover 12 is preferably integrally formed to include side walls 22 that extend to the back edge of the meter. As shown in FIGS. 2-4, the case also includes an inner frame, indicated generally at 24, which includes a face 26 generally parallel to the front face 14 of the cover in addition to side walls 28 which abut the side walls 22 of the cover 12. As is best shown in FIG. 2, the cover is preferably snap-fit to the inner frame 24 by a number of inclined ears 30 extending outwardly of the side walls 28 which engage cooperating recesses located within the inner surface of the side walls 22. Both the cover 12 and the inner frame 24 are preferably formed of plastic material, such as butyrate or the like, which is somewhat resiliant and enables the cover to be forced on the inner frame in interlocking engagement. The front face 14 of the cover is spaced away from the face 26 of the inner frame and a number of reinforcing elements 32 are positioned adjacent the side walls 22 as shown in FIGS. 1 and 3.

In accordance with an important aspect of the present invention, the inner frame has a relatively small shaft 34 extending outwardly toward the front of the meter which is adapted to hold the pointer 18. A circular opening 36 is formed rearwardly of the shaft 34 and is concentric with the shaft as best shown in FIGS. 3 and 4. The calibration and zero adjustment means indicated generally at 38 is adapted to fit within the opening 36 as will be more fully described.

Referring to FIGS. 2 and 4, a current conducting member, indicated generally at 40, has an elongated portion 42 extending horizontally across the front surface of the inner frame 24 adjacent the shaft 34. The conductive member 40 also has transversly extending end portions 44 that are directed rearwardly beyond the back surface of the meter and define electrical terminals for connection to an electrical circuit by well known means (not shown). Each of the end portions 44 have an inwardly angled deflectable ear 46 which abuts the back surface of the face 26 to prevent it from becoming separated. It should be understood from the view shown in FIG. 4 that the conductive member 40 may be easily inserted by merely placing the transverse end portions 44 through cooperating slots 48 located in the face 26 of the inner frame 24 and that application of sufficient force to deflect the angled ears 46, the member will be locked in place.

The end portions 44 of the conductive member may be of a size that is comparable to prongs found in plugs of common electrical appliances, although the spacing between the two end portions 44 is not intended to approximate the spacing of the prongs in such plugs. The conducting member 40 is preferably made from relatively thin copper strip or the like and may have a thickness of about three hundredths of an inch, a width of about one quarter inch, although such dimensions are not particularly critical. As is best seen in FIGS. 2 and 3, the elongated portion 42 has an aperture 50 located therein generally midway between the upper and lower surfaces as well as midway between the end portions through which may pass the shaft 34 that is attached to the inner frame 24. The aperture 50 is preferably larger than the diameter of the shaft so that electrical contact is not made between the shaft and the member.

Turning now to the pointer 18 shown in FIGS. 1, 2 and 4, it comprises a generally circularly shaped center portion 52 and an elongated portion 54 defining a needle or pointer which extends upwardly to the indicia or marks 16. It also has a counterweight portion 56 located opposite the elongated portion 54. It is preferred that the weight of the portions 54 and 56 be approximately equal to balance the pointer 18 generally around the center of the central portion 52 which has a sleeve 60 that is preferably integrally formed and an aperture 62 therein for receiving the shaft 34 attached to the inner frame 24. The pointer 18 is preferably integrally formed of a non-ferromagnetic material, such as delrin with molybdenum disulfide or other plastic material, preferably having a low coefficient of friction, so that the pointer will freely pivot around the shaft in response to forces created by the flow of current through the conductive member 40 during operation.

A magnet 64 of a generally flat circular shape and having a concentrically located aperture is attached to the pointer 18, the aperture being slightly larger than the outer diameter of the sleeve 60 so that the sleeve may extend through the aperture of the magnet. The magnet 64 is preferably formed of a ceramic material and magnetized along a diameter so that the north and south poles are diametrically opposed of one another. The magnet 64 is preferably adhesively attached to the pointer 18, although other methods of attachment, such as by force fitting the magnet to the sleeve 60, may be used. The orientation of a line through the poles should be perpendicular to the direction of the elongated portion 54.

Turning now to an important aspect of the present invention and referring specifically to the calibrating and zero adjusting means 38 shown in FIG. 3, it comprises a generally circularly shaped magnet holder 70 having an outer diameter approximately equal to the inside diameter of the opening 36 formed in the inner frame 24. The magnet holder 70 has a series of arcuate openings 72 extending around and adjacent to the outer surface of the holder to provide a measure of resiliency for the magnet holder which is preferably formed of plastic material, such as is used for the case 12. It is preferred that the outer surface of the magnet holder 70 have a series of relatively small beads or bumps, (not shown) extending outwardly along radially lines which pass through the center of the openings 72, as the maximum resilience of the outer wall portion 74 would be at this location. Thus, the beads on these wall portions would provide the necessary frictional holding force to maintain the magnet holder 70 at the position it is placed within the opening 36, the location being determined during calibration and zero adjustment manipulation.

A magnet 76, substantially similar in size and composition to the magnet 64 attached to the pointer 18, is also attached to the magnet holder 70 and also has diametrically opposed poles. The purpose of the magnet 76 is to provide a zero adjustment for the pointer 18 so that it indicates a zero reading when no current is flowing through the conducting member 40, as well as provide a restoring force for the pointer that is necessary for calibrating the needle to provide accurate measurements over the range of values of the indicating scale. For example, in the event the meter is to read a maximum value of 100 amperes, as opposed to a maximum value of 50 amperes, it would be necessary that the magnet 76 more forcefully oppose the movement of the pointer in a clockwise direction as shown in FIG. 1 for the larger maximum reading. The force opposing the clockwise movement of the pointer 18 exerted by the magnet 76 is a function of the distance between the magnet 76 and the magnet 64. As is best shown in FIGS. 2 and 4, the magnet holder 70 is adapted to be moved toward and away from the pointer 18 within the opening 36 by manual manipulation. In this manner, the meter can be calibrated to indicate the values marked on the scale of the meter by the indicia 16. Similarly, by rotating the magnet holder 70, the pointer 18 can be set to indicate a zero reading when no current is flowing through the conductive member 40. The rotational capability of the magnet holder also enables the meter to have a center zero reading with positive and negative measurements to either the left or right being possible without modifying the meter. Thus, the magnet holder 70 can be rotated to set the pointer at a zero reading location either at the end or in the center of the scale.

More specifically, when no current flows through the conductive member 40, the pointer is held in the zero position by the attraction between the magnet 64 and the magnet 76. When current flows through the member 40, the field interacts with the pointer magnet 64 and causes movement of the pointer in a clockwise direction indicating the magnitude of the current on the scale. As previously mentioned, the distance between the magnet 76 and the magnet 64 determines the strength of the field which provides a resistance or restoring force and the position of the magnet holder 70 can be properly determined during calibration. The linear and the angular movement and setting that can be imparted to the magnet holder 70 permits the meter of the present invention to be calibrated for different maximum scale current values without modification to the meter itself.

Moreover, the ease with which the calibration can be accomplished permits the meter to be installed in equipment or a panelboard and thereafter be accurately calibrated. The capability of being calibrated in the actual physical location in which it operates, rather than at the factory after assembly, enables the meter to be compensated for such conditions as: the kind of material in which it is mounted, whether bakelite, metal or the like; the thickness of the metal if installed in a metal panel; and extraneous magnetic fields produced by other electrical components that may be near and the like. The meter embodying the present invention permits compensation for these influencing conditions without expensive shielding, which is typically not incorporated in so-called economy meters. The present invention has the advantages of shielding without the cost thereof, since the meter can be calibrated in its installed location to compensate for the very influences that shielding isolates from the meter.

While the pointer 18 is shown to be carried by the shaft 34 and is slidably as well as rotatably moveable thereon, the magnetic attraction between the pointer magnet 64 and the conductive member 40 is sufficient to maintain the pointer upon the shaft, with little tendency to fall off or ride back into contact with the face 14 of the cover 12. While the indicator 18 does not contact the front face of the cover during normal operation, it is sufficiently close to the pointer to prohibit the pointer from being completely separated from the shaft 34 during shipment or installation, and accordingly, it should not be necessary to separate the cover from the inner frame of the case. The calibration and zero adjustment can be performed by adjusting the magnet holder 70 which is accessable from the back of the meter. If desired, a pair of stop members 80 may be formed in either the cover or the inner frame 24 to limit the movement of the pointer between these two positions.

From the foregoing detailed description, it should be understood that an ammeter embodying the present invention has been described which is constructed of a relatively small number of components, all of which are relatively easily fabricated. The meter is attractive, compact and simple in its design and may be easily adjusted and calibrated using well known techniques. The compact design and relatively small number of components enables the meter to be inexpensively manufactured using mass production techniques.

While the present invention is susceptible of various modifications and alternative constructions, certain perferred embodiments are shown and described herein. It should be understood however, that it is not intended to limit the invention to the specific forms disclosed. On the contrary, it is intended that all substitutions, equivalents and modifications be covered as may be included within the spirit and scope of the present invention as expressed in the appended claims.

Various features of the invention are set forth in the following claims.

What is claimed is:

1. A meter for measuring electrical current in a circuit, comprising:
   case means, having front and back sides and a visible front face for placing indicia defining a measuring scale, a shaft secured to the case means and extending toward the front thereof for supporting a pointer means, and a generally circularly shaped opening in the back located rearwardly of the shaft;
   pointer means having a central portion with an aperture therein for receiving said shaft, an elongated pointer extending downwardly from the central portion, a counterweight portion opposite said pointer, and a first ferromagnetic member attached to the central portion, said pointer means being balanced and rotatable around said shaft;
   an electrical current conductive member attached to the housing and having an elongated portion extending adjacent said pointer means for influencing the same in response to current flowing through the conductive member;
   calibrating and zero adjustment means comprising a holder having a second ferromagnetic member secured thereto, said holder having a resilient outer periphery for frictionally engaging an inner surface of said opening of said case means, said calibrating and zero adjustment means being rotatable and spacially adjustable relative to said pointer means and said elongated portion of said current conductive means for enabling calibrating and adjustment of said meter.

2. A meter as defined in claim 1 wherein said pointer means has a generally circular shaped central portion with an axially aligned sleeve containing said aperture, the weight of said elongated pointer approximating the weight of said counterweight portion, said central portion, elongated pointer and counterweight portion being integrally formed of a non-ferromagnetic material.

3. A meter as defined in claim 2 wherein said first magnetic member is of a generally flat circular shape approximating the size of the central portion of said pointer means and being attached thereto.

4. A meter as defined in claim 3 wherein said first ferromagnetic member has a concentric aperture with a diameter greater than a diameter of said sleeve, said magnetic member being attached to said central portion so that said sleeve extends therethrough.

5. A meter as defined in claim 1 wherein said current conductive member comprises said elongated portion having a width approaching the width of said first ferromagnetic member and transversly extending end portions directed toward said back of the meter, said case means having a pair of slots for receiving said end portions, each of said end portions having an inwardly angled resilient ear, the ends of which abut said case means to prohibit separation of the conductive member therefrom.

6. A meter as defined in claim 5 wherein said conductive member has an aperture therein through which said shaft extends, said aperture being centrally located in said elongated portion of said conductive member.

7. A meter as defined in claim 5 wherein said transverse end portions of said conductive member extend outwardly of the back of said case means and define electrical terminals for connection to an electrical circuit.

8. A meter as defined in claim 1 wherein said pointer means is rotatable on said shaft and the magnetic attraction between said first ferromagnetic member and said conductive member provides sufficient force to maintain said pointer means on said shaft.

9. A meter as defined in claim 4 wherein said flat circular shaped ferromagnetic member is formed of a ceramic ferromagnetic material that is magnetized along its diameter resulting in oppositely disposed north and south poles.

10. A meter as defined in claim 1 wherein said second ferromagnetic member has a generally flat circular shape and is comprised of a ceramic magnetic material, magnetized along the diameter so as to produce oppositely disposed north and south poles.

11. A meter as defined in claim 1 wherein said case means is of a non-ferromagnetic material and comprises an inner frame portion and an interlocking outer cover, a portion of said cover adjacent said front face being generally transparent to enable observation of said elongated pointer and said visible front face.

12. A meter as defined in claim 11 wherein said cover is spaced away from said pointer means, one of either said cover or said inner frame having stop means located on opposite sides of said measuring scale indicia to limit the movement of said elongated pointer.

13. A meter as defined in claim 11 wherein side walls of said inner frame are in contact with the inner surface of side walls of said cover, said contacting side walls having cooperative recesses and ears to resiliently lock said inner frame and cover together.

* * * * *